United States Patent
Kim et al.

(10) Patent No.: US 10,044,415 B2
(45) Date of Patent: Aug. 7, 2018

(54) SYSTEM, METHOD, AND MODULE FOR RF-SIGNAL COVERAGE FOR AUTOMOTIVE VEHICLES

(71) Applicant: Murata Manufacturing Co., Ltd., Nagaokakyo-shi, Kyoto-fu (JP)

(72) Inventors: Stephen W. Kim, Smyrna, GA (US); Akihiro Ochii, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 15/519,571

(22) PCT Filed: Dec. 4, 2015

(86) PCT No.: PCT/US2015/063905
§ 371 (c)(1),
(2) Date: Apr. 17, 2017

(87) PCT Pub. No.: WO2016/090211
PCT Pub. Date: Jun. 9, 2016

(65) Prior Publication Data
US 2017/0250738 A1   Aug. 31, 2017

Related U.S. Application Data

(60) Provisional application No. 62/087,824, filed on Dec. 5, 2014.

(51) Int. Cl.
*H04M 1/00* (2006.01)
*H04B 7/04* (2017.01)
(Continued)

(52) U.S. Cl.
CPC .............. *H04B 7/04* (2013.01); *H04B 1/0057* (2013.01); *H04L 5/14* (2013.01); *H04W 4/046* (2013.01); *H04W 52/52* (2013.01)

(58) Field of Classification Search
None
See application file for complete search history.

(56) References Cited

U.S. PATENT DOCUMENTS 5,155,494 A * 10/1992 Bryant ................. H01Q 1/1285
343/713
5,603,080 A * 2/1997 Kallander ................ H04B 5/02
455/14

(Continued)

FOREIGN PATENT DOCUMENTS

EP        2 495 882 A1    9/2012
JP        2004-166072 A   6/2004

OTHER PUBLICATIONS

Official Communication issued in International Patent Application No. PCT/US2015/063905, dated Mar. 15, 2016.
(Continued)

*Primary Examiner* — Tuan A Tran
(74) *Attorney, Agent, or Firm* — Keating & Bennett, LLP

(57) ABSTRACT

An antenna system for an automotive vehicle includes an outside antenna that is located outside of the automotive vehicle, an inside antenna that includes an RF radiating cable and that is located inside of the automotive vehicle, and a wireless communication module. The inside antenna is connected between the outside antenna and the wireless communication module such that all signals received and transmitted by the outside antenna are received and transmitted through the inside antenna.

16 Claims, 4 Drawing Sheets

(51) Int. Cl.
*H04L 5/14* (2006.01)
*H04W 52/52* (2009.01)
*H04W 4/04* (2009.01)
*H04B 1/00* (2006.01)

(56) References Cited

U.S. PATENT DOCUMENTS

| | | | | |
|---|---|---|---|---|
| 5,898,908 | A * | 4/1999 | Griffin | H04B 1/3877 343/702 |
| 6,275,194 | B1 * | 8/2001 | Ansorge | H01Q 1/10 343/713 |
| 6,493,546 | B2 * | 12/2002 | Patsiokas | H04B 1/207 455/277.1 |
| 7,260,356 | B2 * | 8/2007 | Helstrom | H04H 20/08 455/23 |
| 7,689,165 | B2 * | 3/2010 | Namm | H04B 7/2606 370/276 |
| 8,525,746 | B2 * | 9/2013 | Petrucci | H01Q 1/3275 343/711 |
| 8,750,944 | B2 * | 6/2014 | Rousu | H04B 1/3822 455/569.2 |
| 2002/0123306 | A1 * | 9/2002 | Masoian | H04B 7/155 455/7 |
| 2003/0048228 | A1 * | 3/2003 | Chen | H01Q 1/3291 343/713 |
| 2007/0001809 | A1 * | 1/2007 | Kodukula | G06K 7/0008 340/10.1 |
| 2008/0146147 | A1 * | 6/2008 | Streeter | H04H 20/62 455/41.1 |
| 2011/0298678 | A1 | 12/2011 | Petrucci et al. | |
| 2012/0220315 | A1 | 8/2012 | Karttaavi et al. | |
| 2013/0183911 | A1 | 7/2013 | Erceg et al. | |
| 2013/0336415 | A1 | 12/2013 | Hung | |

OTHER PUBLICATIONS

Official Communication issued in corresponding Japanese Patent Application No. 2017-526498, dated May 22, 2018.

* cited by examiner

SYSTEM, METHOD, AND MODULE FOR RF-SIGNAL COVERAGE FOR AUTOMOTIVE VEHICLES

BACKGROUND OF THE INVENTION

1. Field of the Invention

The present invention relates to providing RF-signal coverage for vehicles, and more specifically, the present invention relates to providing RF-signal coverage both inside and outside of an automotive vehicle at the same time.

2. Description of the Related Art

Recent developments in networking and automotive technologies have resulted in the desire to provide RF-signal coverage both inside and outside an automotive vehicle. Various techniques have been attempted to implement RF-signal coverage both inside and outside of automotive vehicles, in particular, to address the problems associated with the bodies of automotive vehicles, which are typically made of metal and thus provide electromagnetic shields that separate the two desired RF-signal coverage areas.

Known methods of providing RF-signal coverage both inside and outside of an automotive vehicle include simply using an RF combiner or an RF switch to split the RF signal into two signal paths: a first signal path for an outside antenna that provides RF-signal coverage outside the automotive vehicle, and a second signal path for an inside antenna that provides RF-signal coverage inside the automotive vehicle. For example, the inside antenna provides a wireless local area network (WLAN) to connect with WLAN-compatible devices inside the automotive vehicle, such as a portable computer, a rear-seat entertainment console, user gaming devices, and the like, or to provide a personal area network (PAN) to connect with PAN-compatible devices, such as a hands-free Bluetooth connection for a cellular phone or other similar device. The outside antenna provides a wireless connection to, for example, WiFi hotspots, access points at residential houses, a dealership service center, and the like.

Although RF switches provide low insertion loss and high isolation between the outside and inside antennas, RF switches permit only one of the outside and inside antennas to be connected at any given time. The outside antenna 101 and inside antenna 102 are typically switched by time division control, for example, of a single-pole double-throw (SPDT) switch 110 as shown in FIG. 6, and overall communication throughput is low because the outside antenna 101 and inside antenna 102 cannot communicate at the same time. That is, relying on an SPDT 110 to combine signal paths to an inside antenna 102 and an outside antenna 101 causes the problem that the inside antenna 102 and outside antenna 101 cannot transmit or receive the RF signals simultaneously.

An RF combiner, or a similar device such as an RF divider or an RF splitter, permits both the outside antenna 101 and inside antenna 102 to communicate at the same time. However, a device 111, such as an RF combiner, divider, or splitter, an example of which is shown in FIG. 7, typically has high insertion loss and low isolation between the outside antenna 101 and inside antenna 102, which reduces signal quality and causes a loss of throughput and a decrease in connection distances. In particular, using such a device 111 to combine signal paths to an inside antenna 102 and an outside antenna 101 results in a high insertion loss to the outside antenna 101, for example, approximately 3.5 dB, and a low isolation between the inside antenna 101 and the outside antenna 102, for example, approximately 3.5 dB.

Furthermore, the above-described methods for providing RF-signal coverage both outside and inside of an automotive vehicle require two different antennas and a substantial length of RF cabling, which leads to high cost and complexity for implementing such methods.

Although known RF radiating cables provide RF-signal coverage for tunnels or buildings, for example, RF radiating cables have not been designed or arranged to provide antennas for automotive vehicle applications.

SUMMARY OF THE INVENTION

To overcome the problems described above, preferred embodiments of the present invention provide a system, method, and module for providing RF-signal coverage both outside and inside of an automotive vehicle. According to the preferred embodiments of the present invention, the number of antennas and/or the length of RF cabling used to provide RF-signal coverage inside and outside an automotive vehicle are reduced according to the arrangement of an RF radiating cable and/or a directional coupler. Thus, communication is performed both inside and outside of the automotive vehicle at the same time, without any significant reduction in data speed or throughput.

Further, the preferred embodiments of the present invention provide RF-signal coverage both outside and inside of an automotive vehicle in a cost-effective manner.

An antenna system for an automotive vehicle of a preferred embodiment of the present invention includes an outside antenna that is located outside of the automotive vehicle, an inside antenna that includes an RF radiating cable and that is located inside of the automotive vehicle, and a wireless communication module. The inside antenna is connected between the outside antenna and the wireless communication module such that all signals received and transmitted by the outside antenna are received and transmitted through the inside antenna.

Preferably, the wireless communication module includes an IC with a first receiving circuit and a first transmitting circuit, and the first receiving circuit and the first transmitting circuit receive and transmit first signals with a first frequency.

The wireless communication module preferably includes a duplexer connected between the inside antenna and the IC such that the first receiving circuit is isolated from the first transmitting circuit and such that the first signals are received and transmitted using the inside antenna and the outside antenna. The wireless communication module preferably includes a power amplifier connected between the duplexer and the first transmitting circuit. The wireless communication module includes a low-noise amplifier connected between the duplexer and the first receiving circuit.

Preferably, the IC includes a second receiving circuit and a second transmitting circuit, and the second receiving circuit and the second transmitting circuit receive and transmit second signals with a second frequency. Preferably, the wireless communication module includes a diplexer connected between the inside antenna and the IC, and the diplexer separates and combines the first signals and the second signals.

The wireless communication module preferably includes a first switch connected to the diplexer, the first receiving circuit, and the first transmitting circuit. The wireless communication module preferably includes a first power amplifier connected between the first switch and the first transmitting circuit. The wireless communication module preferably includes a first low-noise amplifier connected between the first switch and the first receiving circuit.

The wireless communication module preferably includes a second switch connected to the diplexer, the second receiving circuit, and the second transmitting circuit. The wireless communication module preferably includes a second power amplifier connected between the second switch and the second transmitting circuit. The wireless communication module preferably includes a second low-noise amplifier connected between the second switch and the second receiving circuit.

Preferably, the IC includes a third receiving circuit and a third transmitting circuit, and the third receiving circuit and the third transmitting circuit receive and transmit third signals with a third frequency.

Preferably, the IC includes a third receiving circuit and a third transmitting circuit, and the third receiving circuit and the third transmitting circuit receive and transmit third signals with a third frequency. The second switch is connected to the third receiving circuit and the third transmitting circuit.

The above and other features, elements, characteristics, steps, and advantages of the present invention will become more apparent from the following detailed description of preferred embodiments of the present invention with reference to the attached drawings.

DETAILED DESCRIPTION OF PREFERRED EMBODIMENTS

Figure 1:
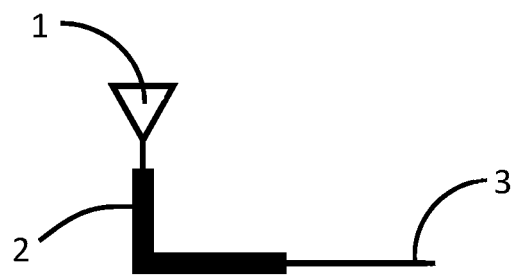
FIG. 1 shows an arrangement of outside and inside antennas according to a first preferred embodiment of the present invention.
Figure 2:
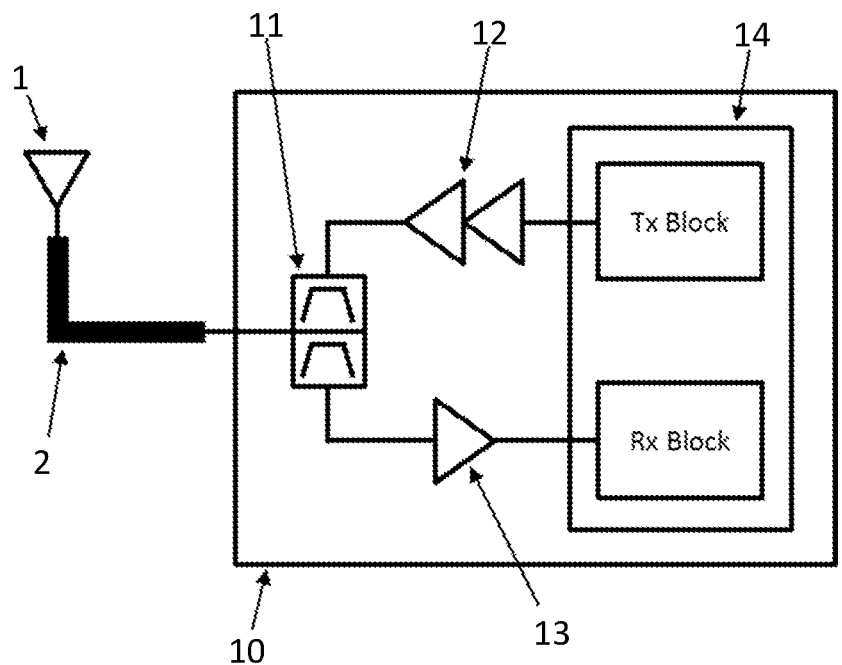
FIG. 2 shows a wireless communication system according to a first preferred embodiment of the present invention.
Figure 3:
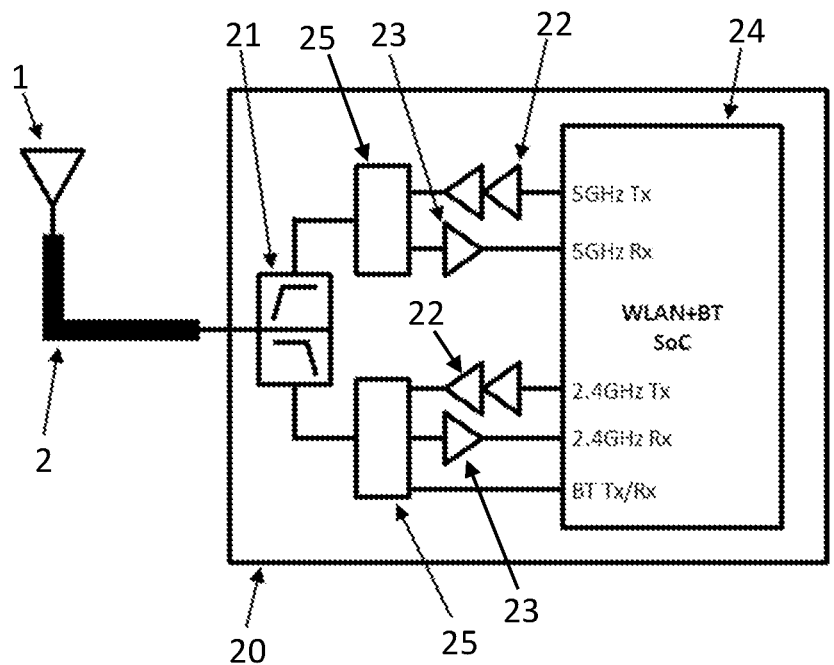
FIG. 3 shows another wireless communication system according to the first preferred embodiment of the present invention

According to a first preferred embodiment of the present invention as shown in FIGS. 1-3, only one antenna is required to cover both the outside and inside of an automotive vehicle. The single antenna includes, at one end, an outside antenna 1 that is preferably a typical antenna, which include, for example, whip antenna, rod antenna, or shark fin antenna, and, at the other end, an inside antenna 2 that is an RF radiating cable. One end of the inside antenna 2 can be connected to an RF port 3. RF-signal coverage for inside of the automotive vehicle is provided by the inside antenna 2 to cover inside the automotive vehicle and operate as an antenna. The wireless coverage outside of the automotive vehicle is preferably covered by the outside antenna 1. According to this arrangement as shown in FIG. 1, only one RF cable is required for RF-signal coverage of both the outside and the inside of the automotive vehicle, and a single antenna covers both areas.

FIG. 2 shows a wireless communication system according to the first preferred embodiment of the present invention. As shown in FIG. 2, the wireless communication system includes an outside antenna 1, an inside antenna 2, and a wireless communication module 10. As shown in FIGS. 1 and 2, the inside antenna 2 is preferably an RF radiating cable, and the outside antenna 1 is preferably a typical antenna.

The wireless communication module 10 shown in FIG. 2 further includes a duplexer 11, a power amplifier 12, a low-noise amplifier 13, and an IC chip 14 with a transmitting circuit Tx and a receiving circuit Rx. The transmitting circuit Tx is connected to the inside antenna 2 and the outside antenna 1 through the power amplifier 12 and the duplexer 11. The receiving circuit Rx is connected to the inside antenna 2 and the outside antenna 1 through the low-noise amplifier 13 and the duplexer 11. The duplexer 11 isolates the receiving circuit Rx from the transmitting circuit Tx while permitting the receiving and transmitting circuits Rx and Tx to share the inside antenna 2 and outside antenna 1. However, according to a preferred embodiment of the present invention, an RF switch may be used in place of the duplexer 11 shown in FIG. 2, while still maintaining high data speed and throughput.

According to the first preferred embodiment of the present invention, the wireless communication module 10 preferably is a combination module which includes a plurality of receiving circuits and/or a plurality of transmitting circuits. FIG. 3 shows another wireless communication system according to the first preferred embodiment of the present invention.

The wireless communication system shown in FIG. 3 includes an outside antenna 1, an inside antenna 2, and a wireless communication module 20. As shown in FIGS. 1 and 3, the inside antenna 2 is preferably a RF radiating cable, and the outside antenna 1 is preferably a typical antenna. The wireless communication module shown in FIG. 3 further includes a diplexer 21 that separates and combines 2.4 GHz signals and 5 GHz signals, switches 25, power amplifiers 22, low-noise amplifiers 23, and an IC chip 24. The IC chip 24 is preferably a "system-on-a-chip" (SoC) that includes 5 GHz Tx and Rx circuits, 2.4 GHz Tx and Rx circuits, and a Bluetooth (BT) Tx/Rx circuit, for example. Signals are transmitted from and received by the wireless communication system shown in FIG. 3 as follows:

1) The 5 GHz Tx circuit sends signals through the top power amplifier 22, the top switch 25, the diplexer 21, the inside antenna 2, and the outside antenna 1.
2) The 5 GHz Rx circuit receives signals from the inside antenna 2, the outside antenna 1, the diplexer 21, the top switch 25, and the top low-noise amplifier 23.
3) The 2.4 GHz Tx circuit sends signals through the bottom power amplifier 22, the bottom switch 25, the diplexer 21, the inside antenna 2, and the outside antenna 1.
4) The 2.4 GHz Rx circuit receives signals from the inside antenna 2, the outside antenna 1, the diplexer 21, the bottom switch 25, and the bottom low-noise amplifier 23.
5) The Bluetooth Tx/Rx circuit transmits and receives signals through the bottom switches 25, the diplexer 21, the inside antenna 2, and the outside antennas 1.

Thus, according to the first preferred embodiment of the present invention, communication may be simultaneously performed both inside and outside of an automotive vehicle, with low attenuation of signals transmitted from and received by the outside antenna.

Figure 4:
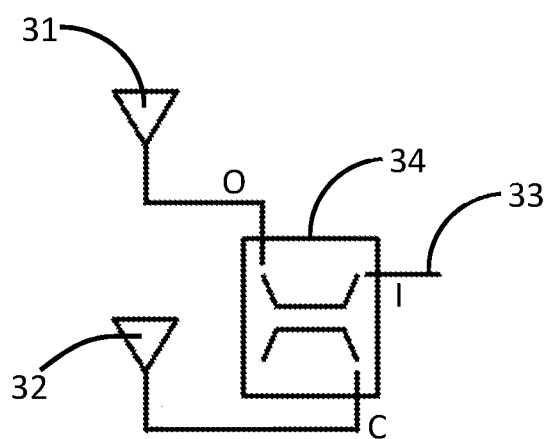
FIG. 4 shows an arrangement of outside and inside antennas according to a second preferred embodiment of the present invention.
Figure 5:
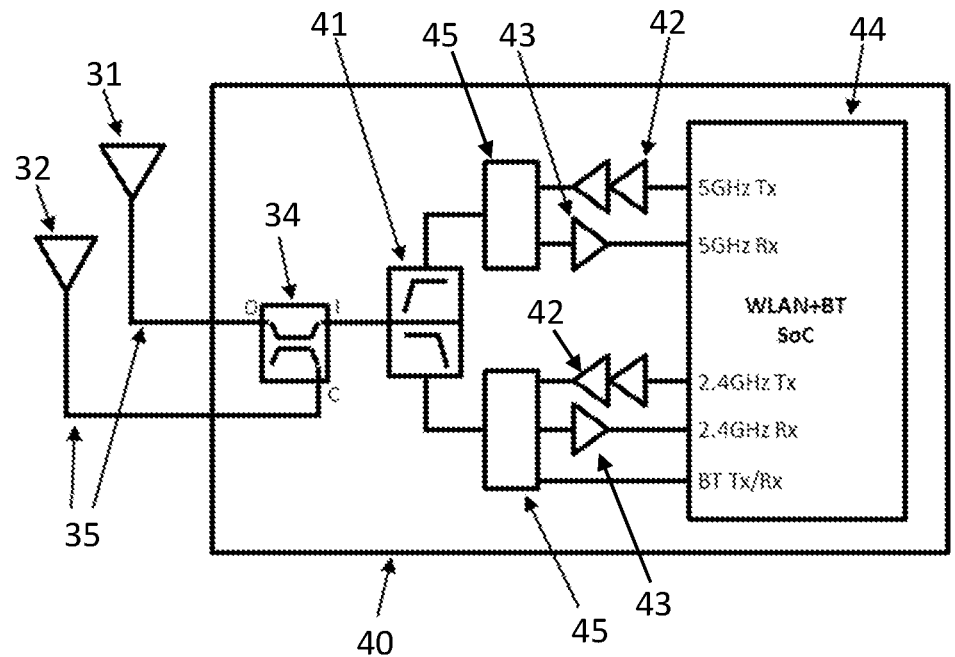
FIG. 5 shows a wireless communication system according to a second preferred embodiment of the present invention.
Figure 6:
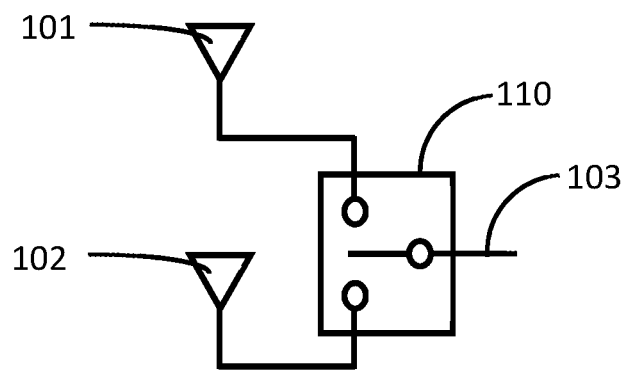
FIG. 6 shows a known arrangement of outside and inside antennas.
Figure 7:
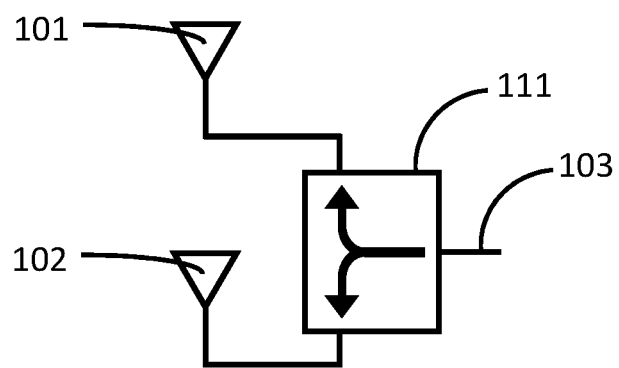
FIG. 7 shows another known arrangement of outside and inside antennas.

According to a second preferred embodiment of the present invention as shown in FIGS. 4 and 5, RF-signal coverage for an automotive vehicle is provided by inside antenna 32 and outside antenna 31 that are coupled by a directional coupler 34 to an RF port 33 of a wireless communication module 40.

FIG. 5 shows a wireless communication system according to the second preferred embodiment of the present invention. As shown in FIG. 5, the wireless communication system includes an inside antenna 32, an outside antenna 31, and a wireless communication module 40. A directional coupler 34 operates as an RF-signal combiner and an RF-signal splitter for the wireless communication module 40, and is preferably included in the wireless communication module 40 as shown in FIG. 5. However, the directional coupler 34 may be included as a separate element connected to an RF port (i.e., an antenna port) of the wireless communication module.

The wireless communication module 40 shown in FIG. 5 further includes a diplexer 41 that separates and combines 2.4 GHz signals and 5 GHz signals, switches 45, power amplifiers 42, low-noise amplifiers 43, and an IC chip 44. Preferably, the diplexer 41, the switches 45, the power amplifiers 42, the low-noise amplifiers 43, and the IC chip 44 are similar to those described above with respect to FIGS. 2 and 3.

As shown in FIG. 5, the wireless communication system may include one or two RF cables 35 for the inside antenna 32 and the outside antenna 31. For example, the inside antenna 32 and the outside antenna 31 can both be typical antennas, or the outside antenna 31 can be a typical antenna with the inside antenna 32 arranged as an RF radiating antenna. Typical outside antennas include, for example, whip antenna, rod antenna, and shark fin antenna. Typical inside antennas include, for example, pattern antenna, chip antenna, and inverted-F antenna.

As shown in FIGS. 4 and 5, the directional coupler 34 includes three ports, including an input port I, an output port O, and a coupling port C. The input port I is connected to the diplexer 41 of the wireless communication module, for example, via an RF port of the wireless communication module 40. The output port O is connected to the outside antenna 31, and the coupling port C is connected to inside antenna 32.

Preferably, a signal provided to the input port I is output from the output port O with only about a couple of tenths of dB of attenuation. The signal provided to the input port I is also output from the coupling port C, but is preferably attenuated by about 6 to 15 dB. However, the attenuation at the coupling port C may be adjusted as desired.

Preferably, a signal provided to the output port O is output from the input port I with only about a couple of tenths of dB of attenuation. The signal provided to the output port O is also output from the coupling port C, but is preferably output from the coupling port C only as a small signal, with an attenuation of about 20 dB to about 40 dB, for example.

Preferably, a signal provided to the coupling port C is output from the input port I with about 6 dB to about 15 dB of attenuation, for example. However, the attenuation at the coupling port C may be adjusted as desired. The signal provided to the coupling port C is also output from the output port O, but is preferably output from output port O only as a small signal, with an attenuation of about 20 dB to about 40 dB, for example.

Thus, according to the second preferred embodiment of the present invention, RF-signal coverage can be provided both inside and outside of an automotive vehicle using a directional coupler as a RF-signal combiner and an RF-signal splitter. Accordingly, RF-signal loss for signals transmitted from and received by an outside antenna is significantly reduced or minimized. In particular, because the RF-signal coverage area for the inside of the automotive vehicle is limited, signals transmitted from and received by the inside antenna can withstand RF-signal loss through a directional coupler, without any significant reduction in data speed or throughput. Further, the directional coupler provides high isolation between the inside and outside antennas, which increases the quality of signals transmitted from and received by the inside and outside antennas.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. An antenna system for an automotive vehicle comprising:

an outside antenna that is located outside of the automotive vehicle;

an inside antenna that includes an RF radiating cable and that is located inside of the automotive vehicle; and a wireless communication module; wherein the inside antenna is connected between the outside antenna and the wireless communication module such that all signals received and transmitted by the outside antenna are received and transmitted through the inside antenna.

2. An antenna system of claim 1, wherein:

the wireless communication module includes an IC with a first receiving circuit and a first transmitting circuit; and the first receiving circuit and the first transmitting circuit receive and transmit first signals with a first frequency.

3. An antenna system of claim 2, wherein the wireless communication module includes a duplexer connected between the inside antenna and the IC such that the first receiving circuit is isolated from the first transmitting circuit and such that the first signals are received and transmitted using the inside antenna and the outside antenna.

4. An antenna system of claim 3, wherein the wireless communication module includes a power amplifier connected between the duplexer and the first transmitting circuit.

5. An antenna system of claim 3, wherein the wireless communication module includes a low-noise amplifier connected between the duplexer and the first receiving circuit.

6. An antenna system of claim 2, wherein:

the IC includes a second receiving circuit and a second transmitting circuit; and the second receiving circuit and the second transmitting circuit receive and transmit second signals with a second frequency.

7. An antenna system of claim 6, wherein:

the wireless communication module includes a diplexer connected between the inside antenna and the IC; and the diplexer separates and combines the first signals and the second signals.

8. An antenna system of claim 7, wherein the wireless communication module includes a first switch connected to the diplexer, the first receiving circuit, and the first transmitting circuit.

9. An antenna system of claim 8, wherein the wireless communication module includes a first power amplifier connected between the first switch and the first transmitting circuit.

10. An antenna system of claim 8, wherein the wireless communication module includes a first low-noise amplifier connected between the first switch and the first receiving circuit.

11. An antenna system of claim 7, wherein the wireless communication module includes a second switch connected to the diplexer, the second receiving circuit, and the second transmitting circuit.

12. An antenna system of claim 11, wherein the wireless communication module includes a second power amplifier connected between the second switch and the second transmitting circuit.

13. An antenna system of claim 11, wherein the wireless communication module includes a second low-noise amplifier connected between the second switch and the second receiving circuit.

14. An antenna system of claim 11, wherein:
the IC includes a third receiving circuit and a third transmitting circuit; and
the third receiving circuit and the third transmitting circuit receive and transmit third signals with a third frequency.

15. An antenna system of claim 14, wherein the second switch is connected to the third receiving circuit and the third transmitting circuit.

16. An antenna system of claim 6, wherein:
the IC includes a third receiving circuit and a third transmitting circuit; and
the third receiving circuit and the third transmitting circuit receive and transmit third signals with a third frequency.

* * * * *